United States Patent [19]

Heil et al.

[11] Patent Number: 4,559,118

[45] Date of Patent: Dec. 17, 1985

[54] MAGNETIC RECORDING MEDIA

[75] Inventors: Guenter Heil, Ludwigshafen; Herbert Spoor, Limburgerhof; Werner Lenz, Bad Duerkheim; Jenoe Kovacs, Hessheim; Werner Grau, Bobenheim-Roxheim; Werner Balz, Limburgerhof; August Lehner, Roedersheim-Gronau, all of Fed. Rep. of Germany

[73] Assignee: BASF Aktiengesellschaft, Fed. Rep. of Germany

[21] Appl. No.: 648,936

[22] Filed: Sep. 10, 1984

[30] Foreign Application Priority Data

Sep. 9, 1983 [DE] Fed. Rep. of Germany ....... 3332503

[51] Int. Cl.$^4$ .............................................. C08F 2/46
[52] U.S. Cl. ........................... 204/159.14; 204/159.15; 204/159.16; 204/159.19; 204/159.22; 428/402; 428/413; 428/423.1; 428/423.7; 428/425.9; 428/480; 428/692; 428/694; 428/900; 428/928
[58] Field of Search ...................... 204/159.14, 159.15, 204/159.16, 159.19, 159.22; 428/900, 928

[56] References Cited

U.S. PATENT DOCUMENTS 3,948,739  4/1976  Chaudhari et al. ............ 204/159.22

FOREIGN PATENT DOCUMENTS

| 2201430 | 7/1973 | Fed. Rep. of Germany . |
| 50-77433 | 6/1975 | Japan . |
| 54-124709 | 8/1979 | Japan . |
| 1357012 | 6/1974 | United Kingdom . |
| 1361518 | 7/1974 | United Kingdom . |
| 1375177 | 11/1974 | United Kingdom . |
| 1483942 | 8/1977 | United Kingdom . |
| 1519157 | 7/1978 | United Kingdom . |
| 1583412 | 1/1981 | United Kingdom . |
| 2055877 | 3/1981 | United Kingdom . |

*Primary Examiner*—Arthur P. Demers
*Attorney, Agent, or Firm*—Keil & Weinkauf

[57] ABSTRACT

Magnetic recording media comprise a non-magnetic base and one or more magnetic layers consisting of an organic binder matrix containing finely divided magnetic material, the said matrix being obtained by electron beam curing of a mixture of from 50 to 100% by weight of a polyurethane acrylate polymer possessing polymerizable double bonds and from 0 to 50% by weight of an acrylate and/or an acrylate prepolymer and/or an N-vinyl monomer and/or an N-vinyl prepolymer.

1 Claim, No Drawings

MAGNETIC RECORDING MEDIA

The present invention relates to magnetic recording media which comprise a non-magnetic base and one or more magnetic layers consisting of an organic binder matrix containing finely divided magnetic material, the said matrix being obtained by electron beam curing of a mixture of from 50 to 100% by weight of a polyurethane acrylate polymer possessing polymerizable double bonds and from 0 to 50% by weight of an acrylate and/or an acrylate prepolymer and/or an N-vinyl monomer and/or an N-vinyl prepolymer.

The magnetic recording media predominantly used at present, in the form of audio, video and computer tapes and other magnetic computer media possessing flexible or rigid bases, e.g. floppy disks or hard disks, are generally prepared as follows: magnetic dispersions are prepared from magnetic pigments and binders possessing good mechanical properties, the dispersions are applied to bases, in many cases the magnetic particles are oriented magnetically, drying is carried out physically by evaporating large amounts of solvents, and the surface is smoothened and, if required, then chemically cross-linked to produce hard-wearing layers.

In the case of particularly high quality flexible recording media, these binders predominantly consist of tough high molecular weight thermoplastics, e.g. polyurethanes, and thermal crosslinking agents, e.g. polyfunctional isocyanates.

In this procedure, drying and partial curing are carried out in a drying oven, directly after application of the layer to the base. Complete curing takes place slowly in the course of from a few days to weeks. It is true that such binder systems which are selected for the production of magnetic recording media capable of withstanding severe mechanical stresses give magnetic layers which have excellent mechanical properties, e.g. low abrasion, good adhesion to the base, the ability to withstand the various changes in the direction of the tape path without breaking or sticking, a long service life even under different climatic conditions, etc.; however, they are also expensive to manufacture.

For example the high molecular weights make it necessary to use a large amount of solvent for processing, binder concentrations of from 10 to 15% by weight being typical. Moreover, a similar amount of solvent is required when the magnetic pigment is added. Typical ratios of pigment to binder to solvent for high-quality audio and video tapes are, for example, 4–4.5:1:11–12.

The results in correspondingly high solvent costs and an expensive procedure for solvent recovery. In the preparation of the magnetic dispersion, the effective volume of the dispersing apparatus is taken up substantially by solvent and only to a small extent by the components of the magnetic layer.

Another disadvantage of using high molecular weight thermoplastics is that this procedure leads indirectly to a deterioration in the magnetic properties of the magnetic materials. During the dispersing procedure, a certain proportion of the acicular magnetic particles are comminuted, and this leads to tape noise and a poorer signal-to-print-through ratio. The high molecular weight of the binder necessary to achieve very high mechanical quality imposes a certain limit with regard to more rapid dispersing under milder conditions. There is in principle also a limit in connection with the magnetic orienting of the pigments in the still liquid layer shortly after the coating procedure, the binder offering resistance to orientation. The better the orientation ratio, the better is the sensitivity and maximum output level for a particular pigment type and a given pigment concentration.

The use of isocyanates for thermal crosslinking of high molecular weight thermoplastics for the production of magnetic layers likewise entails disadvantages or is very expensive. As a 2-component system, it is possible to use only relatively small amounts if pot life problems are to be avoided. In order to achieve uniform production of very high quality products, a large number of influences in the course of production have to be monitored and precisely controlled. The process is therefore sensitive to any disturbances which may occur, and this can result in production losses.

German Laid-Open Application DOS 2,100,037 discloses a process in which the binders used are olefinically unsaturated polymerizable mixtures of relatively high molecular weight and low molecular weight copolymerizable surface coating resins and monomers, which are chosen so that the binder-forming mixture contains not less than 15% by weight of acrylate radicals and the resulting viscosity of the binder in the absence of solvent is from 0.05 to 3 Pas. When the layer of the magnetic dispersion containing these binders is applied to a base and then exposed to ionizing radiation in the form of accelerated electrons, the relatively low molecular weight binder components are converted into high molecular weight crosslinked material in a fraction of a second. The process does not require any solvent, and the product is simpler to handle as there are no pot life problems. In the preparation of the dispersion, the dispersing time in ball mills was reduced from 7 days to 5 days. However, a disadvantage is that, because of the lack of a solvent, a satisfactory coating can only be obtained without difficulty if the weight ratio is not more than 2:1. Consequently, audio and video tapes, where the pigment/binder ratio is $\geq 4:1$, are in practice impossible to obtain with a uniform coating of the necessary thickness.

According to German Laid-Open Application DOS 2,201,430, this problem is solved by the use of solvents. However, this has a further disadvantage. In order to use as little solvent as possible and at the same time achieve rapid curing or a low curing dose, a large amount of acrylic monomers is used, corresponding to not less than 15, preferably from 40 to 70, % by weight of the binder. The consequent high shrinkage during polymerization and the very high degree of crosslinking result in pronounced cupping of flexible tapes. Whereas this prior art binder imparts improved abrasion resistance, i.e. greater resistance to scratching, to rigid recording media, it results in excessive abrasion in the case of highly flexible recording media owing to microscopic fractures caused by the brittleness of the coating. In general, the magnetic recording media produced in this manner have hitherto proven unsatisfactory.

Japanese Preliminary Published Application 50/077,433 describes the use, as a binder which can be cured by an electron beam, of a polyether urethane acrylate with a molecular weight higher than 400 and two or more polymerizable double bonds per molecule. This binder is prepared by reacting a polyetherol containing terminal OH groups with toluylene diisocyanate in a first reaction stage and, in a second stage, reacting the resulting prepolymer containing terminal isocyanate groups with hydroxyethyl acrylate. When the product is brought to casting viscosity, a binder solution having a solids content of about 60% by weight is obtained. This still constitutes a substantial saving of solvent compared with about 10–15% strength solutions in the case of non-radiation-curable, highly polymeric conventional magnetic binders. Magnetic coatings produced from these are very flexible and exhibit good adhesion, and cupping of the tape does not occur. However, the abrasion resistance of the coatings is poor because they are too soft and not sufficiently tough. Moderate abrasion resistance, which is unsatisfactory in continuous operation, can be achieved only with pigment/binder ratios of not more than 2:1 and only with the addition of non-polymerizable assistants, such as polyethylene wax and silicone oils, in substantial amounts, in general in amounts which are unusually high. The properties are found to be unsatisfactory, particularly under high temperature and humidity conditions.

Japanese Preliminary Published Application 54/124,709 mentions, as electron beam-curable binders for magnetic recording media, mixtures whose essential components comprise classes of substances which are substantially similar to those described in the above German Laid-Open Applications. Urethane acrylates for use as magnetic binders, as are known in principle from the chemistry of radiation-curable coating systems for non-magnetic applications, are also listed. In this procedure, a relatively low molecular weight urethane acrylate is employed together with a highly crosslinking monomer and a non-crosslinking monofunctional monomer. The urethane acrylate, which is a type of compound known from other applications, is synthesized from a diisocyanate possessing two different reactive isocyanate groups, a low molecular weight oligomeric polyesterdiol and hydroxyethyl acrylate. Such urethane acrylates are usually synthesized in a two-stage reaction, using different reactive groups and different temperatures in order to obtain will defined, relatively large molecules having molecular weights as high as about 2000. These typically possess two terminal acrylate double bonds and a very narrow molecular weight distribution, by means of which it is intended to achieve a very low viscosity or a small solvent requirement.

The binders described in this Published Application therefore permit high solids concentrations but are not sufficiently tough, so that, for applications where flexibility and abrasion resistance are important, wear is found to be high. Wear can be reduced by pretreating the base by irradiation with UV light, which results in improved adhesion of the magnetic layer. However, pigment/binder ratios of from 1.5:1 to 2.0:1 which are employed do not give magnetic and electroacoustic properties suitable for audio and video tapes. Although it would be possible to obtain the magnetic properties required for this purpose by using higher pigment concentrations, the mechanical properties would then be unsatisfactory.

According to German Laid-Open Application DOS 3,029,819, an attempt has been made to combine the mechanical advantages offered by high molecular weight thermoplastic polyurethanes crosslinked by means of polyfunctional isocyanates with the advantages of electron beam curing, by employing, as the binder, a mixture of high molecular weight thermoplastic polyurethane and an oligomeric acrylate in the form of a polyester-acrylate, a polyether-acrylate or a urethane acrylate. Satisfactory to good abrasion properties are obtained especially with ratios of about 50:50. However, wear is still too high for present-day requirements.

It is an object of the present invention to develop magnetic recording media of the type stated in the preamble of claim 1, in such a way that, while retaining the advantages of a binder matrix formed by means of electron-beam curing, the recording media still possess very good mechanical and magnetic properties.

We have found that this object is achieved, and that magnetic recording media which comprise a non-magnetic base and one or more magnetic layers consisting of an organic binder matrix containing finely divided magnetic material, the said matrix being obtained by electron beam curing of a mixture of from 50 to 100% by weight of a polyurethane acrylate polymer possessing polymerizable double bonds and from 0 to 50% by weight of an acrylate and/or an acrylate prepolymer and/or an N-vinyl monomer and/or an N-vinyl prepolymer, meet the set requirements if the polyurethane acrylate polymer is composed of (1) one or more diisocyanates,
(2) one or more oligomeric or polymeric diols,
(3) one or more low molecular weight diols, and
(4) one or more monohydroxyalkyl acrylates, and the amount of NCO groups of the diisocyanate is from 95 to 105% of the number of equivalents of OH groups of components 2, 3 and 4 and the molar amounts of the OH-containing components are chosen so that the concentration of urethane groups is from 2.7 to 4.2 moles per kilogram of polyurethane acrylate polymer, with the proviso that the number average molecular weight of the polymer is from 1,000 to 10,000 and the ratio of the weight average to the number average molecular weight is from 2.2 to 3.5.

The present invention furthermore relates to a process for the production of these magnetic recording media.

Because of its method of preparation, the polyurethane acrylate polymer which alone or predominantly constitutes the binder matrix of the novel magnetic recording media, which is formed by means of electron beam curing, contains not only molecules which have a very low molecular weight and, in the simplest case are formed only from one diisocyanate molecule and two hydroxyalkyl acrylate molecules, but also molecules which have a very high molecular weight, i.e. above 10,000. Furthermore, there is also a relatively small amount of compounds which contain only one type of diol in the molecule. Although for number average molecular weights of, for example, 6,000 it was possible to detect molecular weights of about 110,000–120,000 by means of high pressure gel chromatography, the weight average molecular weight of the entire polyurethane mixture is substantially lower and, for example, for the number average molecular weight of 6,000, is typically about 16,000–18,000.

By suitably matching the type and amount of the components used for synthesizing the polyurethane acrylates, and further appropriate combination with the other radiation-curable binder components which may be admixed, it is possible to use these polyurethane acrylate polymers, which have a broad molecular weight distribution, to produce very tough binder films after irradiation with accelerated electrons. Whereas to date it has been possible to achieve high tensile strengths for pure radiation-polymerized films in tensile test only in conjunction with a low elongation at break, and vice versa, for example a tensile strength higher than 30 N/mm² and an elongation at break of about 10–50%, or a tensile strength of about 15–25 N/mm² and an elongation at break of about 100%, it is now possible to achieve tensile strengths higher than 30–40 N/mm², in isolated cases higher than 45 N/mm², coupled with an elongation at break of about 100–200%.

Because of the high tensile strength and high abrasion resistance, it is possible, in the case of highly pigmented magnetic layers, to achieve good resistance to purely scratching and pronounced frictional stresses, coupled with high abrasion resistance when in addition a deformation stress causing fracture has to be withstood, which requires a high elongation at break.

However, the hardness and flexibility depend not only on the molecular weight distribution of the polyurethane acrylate used but also on the degree of crosslinking of the cured binder mixture; this degree of crosslinking can be adjusted via the concentration of the crosslinking acrylate double bonds.

The contribution of the individual components used for synthesizing the binder to the glass transition temperature resulting on polymerization or to the modulus of elasticity as a measure of the hardness likewise has to be borne in mind.

However, these adjustments are similar to those usually made by the skilled worker in order to obtain formulations possessing a low or high degree of crosslinking or modulus of elasticity, by adding suitable amounts of monomers possessing functional groups, or selecting components having softer or harder structural elements, the combinations of which permit lower or higher moduli of elasticity to be obtained. A modulus of elasticity of less than 700, preferably from 100 to 500, N/mm² is very suitable. For magnetic recording media which have to meet less stringent requirements with regard to flexibility or which have a low pigment/binder ratio, it is also possible for the modulus of elasticity to be as high as about 1000 N/mm². Values less than 100, e.g. from 10 to 20, N/mm² can likewise give good abrasion properties for tape applications, but in this case the durability and the stability under high temperature and humidity conditions are frequently poorer.

The concentration of crosslinking in the binders must not be set too high. It depends on the concentration of all acrylate double bonds present in compounds which contain more than one such double bond in the molecule. A concentration of crosslinking of from 0.2 to 1.5, preferably from 0.5 to 1.1, moles of acrylate double bonds per kg of binder mixture (without solvent) is generally sufficient for flexible, highly pigmented magnetic recording media. For less critical applications, a concentration of crosslinking of not more than 2–2.5 is advantageous. A concentration of crosslinking of 1.0 is equivalent to 7.1% by weight of acrylate radicals $CH_2=CH-COO-$.

The concentration of crosslinking can be controlled in a variety of ways. If polyurethane acrylate polymers possessing terminal acrylate groups are used exclusively, the molecular weight also determines the concentration of crosslinking. Hence, a number average molecular weight of about 1,800–4,000 gives the preferred range of the concentration of crosslinking. When higher molecular weights with necessarily lower concentrations of crosslinking are employed, it is possible to compensate them by using prepolymers and/or monomers which produce more pronounced crosslinking.

On the other hand, an excessively high concentration of crosslinking due to polymers and prepolymers having too low a molecular weight can be reduced by adding monofunctional monomers. Where the molecular weight of the polyurethane acrylate is <2,000, some mechanical properties begin to deteriorate; when the molecular weight is below 1,000, these properties are virtually useless for applications where high flexibility is required. Although there is no upper limit in the choice of molecular weight with regard to achieving good mechanical properties, there is such a limit in respect of the saving of solvent and the effect on magnetic properties.

The concentration of the urethane groups in the polyurethane acrylate polymer can be used as a parameter for controlling the properties of the polyurethane acrylate and the choice of the molar ratio of the diol components to one another. Because of the very different equivalent weights of the components which can be used, there is also a very wide range of variation in the molar ratios of the components in the polyurethane acrylate polymer. With regard to the ratios, the following applies:

Where the isocyanate and hydroxyl groups employed are completely converted to urethane groups, the theoretical concentration of urethane groups, which can readily be calculated from stoichiometry, is a useful aid in selecting suitable compositions, regardless of the extent of any other types of bonds of the isocyanate nitrogen which are formed in minor amounts by side reactions. The polyurethane acrylate polymer which constitutes the binder matrix has a urethane concentration of from 2.7 to 4.2, preferably from 3.1 to 3.9, moles/kg. The higher the urethane concentration, the tougher is the binder but the more unfavorable are the rheological properties with regard to processing, and the magnetic properties also differ from the optimum possible ones. Concentrations of urethane groups which are too low have the opposite effect in each case. Hence, the upper limit is determined by the flow characteristics and the lower limit by the mechanical properties.

If the only diols used are aliphatic components as are obtainable in an economical and conventional manner in polyurethane chemistry, the pure polyurethane acrylates are too soft at urethane concentrations of less than about 3.1, and in unfavorable cases at concentrations of less than 3.5 moles of NH per kg. For the lower range of urethane concentrations, isocyanates having relatively high isocyanate equivalent weights are more suitable than those having low equivalent weights, for example diphenylmethane diisocyanate is more advantageous in this case than is, for example, toluylene diisocyanate.

Where relatively large amounts of hard acrylate prepolymers and/or monomers are used, it is also possible to choose a urethane concentration lower than 3.1 moles/kg for establishing the most suitable hardness or modulus of elasticity.

When the polyurethane acrylate polymer is used as the only binder constituting the binder matrix of the magnetic layer of the novel recording medium after electron beam curing, a number average molecular weight of from 1,400 to 6,000, in particular from 1,800 to 4,000, is preferred. The addition of conventional acrylate monomers or prepolymers or other vinyl monomers leads to a further broadening of the molecular weight distribution of the binders, in the form of bimodal or polymodal distributions. Amounts up to 50%, preferably up to 30%, of radiation-curable components can be added to the polyurethane acrylate polymer.

In order to prepare the polyurethane acrylate polymers possessing a broad molecular weight distribution, the hydroxyl-containing and isocyanate components need not be reacted stepwise with one another. It is generally sufficient initially to take one type of reactant and to run in the other type. A special temperature regime is not necessary in this case. Preferably, all hydroxyl-containing components are initially charged in a solvent, and the diisocyanate or a mixture of diisocyanates is run in over 0.5-3 hours at a reaction temperature of from 40° to 80° C., preferably from 60° to 70° C., while cooling. Stirring in then continued for a few hours, until the residual isocyanate content is less than 0.1% by weight of NCO. To complete the reaction, conventional catalysts are employed. The desired polyurethane acrylate solution is thus obtained in a simple manner and can be processed further. The desired molecular weight can be controlled relatively easily by calculating the required amount of monohydroxyalkyl acrylate, which serves as a chain terminator.

The simple process described automatically gives the preferred broad molecular weight distribution. The width of the distribution can be further modified if, for example, two or more polyurethane acrylates prepared in this manner and having different mean molecular weights are combined in a binder, or a polyurethane acrylate which is prepared by a stepwise process and has a narrower molecular weight distribution and a similar mean molecular weight is added.

The use of very readily polymerizable acrylate double bonds makes suitable stabilization a necessary additional measure in order to avoid premature gelling, the formation of swollen particles or simply an undesirable molecular weight outside the calculated range. A large number of free radical inhibitors, as are known from the chemistry of radiation-curable coatings as state of the art, can be used for this purpose.

Diisocyanates (component 1) suitable for the preparation of the polyurethane acrylate polymers can be aliphatic, cycloaliphatic or aromatic. Examples of suitable compounds are hexamethylene diisocyanate, 2,2,4- and 2,4,4-trimethylhexamethylene diisocyanate, isophorone diisocyanate, bis-(4-isocyanatocyclohexyl)-methane, bis-(3-methyl-4-isocyanatocyclohexyl)-methane, 2,2-bis-(4-isocyanatocyclohexyl)-propane, 4,4'-diphenylmethane diisocyanate, 2,4- and 2,6-toluylene diisocyanate and 1,5-naphthylene diisocyanate.

(Components 2) which can be used as oligomeric or polymeric diols have molecular weights of from 400 to 2,500, preferably from 700 to 2,000. Lower molecular weights result in poorer mechanical properties, while higher molecular weight diols lead to poorer flow characteristics in some cases. Molecular weights of from 800 to 1,800 are generally particularly advantageous. The substances known from the chemistry of the elastomeric polyurethane high polymers can be employed, examples of these being polyesterols, such as adipates based on glycols, polycaprolactones, polyethers and polycarbonates. Polyethers, e.g. polytetrahydrofuran, polypropylene glycol and others, are less suitable as the only polydiol component, since they give products which are too soft and more moisture-sensitive. They can therefore generally only be used in the form of mixtures with other polydiols. Preferred polydiols are adipates with glycol (molecular weight 2,000), with diethylene glycol (molecular weight 2,000), with butane-1,4-diol (molecular weight from 900 to 1,100), with hexane-1,6-diol (molecular weight from 800 to 2,500) and with 2,2-dimethylpropane-1,3-diol (molecular weight from 900 to 1,100) or polycaprolactones (molecular weight from 830 to 2,000) and polycarbonate (molecular weight 2,000).

Suitable low molecular weight diols for the (component 3) are those having molecular weights of less than 500, preferably less than 300. Examples of suitable compounds are ethylene glycol, propane-1,2-diol, propane-1,3-diol, butane-1,4-diol, hexane-1,6-diol, pentane-1,5-diol, decanediol, methylpropane-1,3-diol, 2,2-dimethylpropane-1,3-diol, 2,2-dimethylbutane-1,4-diol, 2-methyl-2-butylpropane-1,3-diol, neopentylglycol hydroxypivalate, diethylene glycol, triethylene glycol, tetraethylene glycol, dipropylene glycol, tripropylene glycol, etc.

Monohydroxyalkyl acrylates employed as (component 4) are acrylates which have molecular weights of from 116 to about 350 and which are formally derived from diols or triols and acrylic acid, e.g. ethylene glycol monoacrylate, 1,2-hydroxypropyl acrylate, 1,3-hydroxypropyl acrylate, butane-1,4-diol monoacrylate, n-butylglycerol ether monoacrylate, 2-ethylhexylglycerol ether monoacrylate or versatic acid glycerol ester monoacrylate. These acrylates can be prepared by a conventional method, either from the corresponding diols by direct esterification or transesterification, or can be obtained in the form of 2-hydroxyalkyl acrylates by reaction of acrylic acid with epoxides, glycidyl ethers or glycidyl esters, e.g. ethylene oxide, propylene oxide, butylene oxide, n-butyl glycidyl ether, 2-ethylhexyl glycidyl ether or glycidyl versatate (British Pat. No. 1,375,177).

The polyurethane acrylate polymers are prepared predominantly in solution. Suitable solvents are those which are free of groups which can react with isocyanates, e.g. ketones, ethers and esters, and, if appropriate, also aromatic hydrocarbons or chlorohydrocarbons or mixtures of these. Acetone, methyl ethyl ketone, tetrahydrofuran, dioxane, ethyl acetate and methylene chloride are preferred. However, a minor amount of any other solvent employed today for the production of magnetic recording media using high molecular weight thermoplastic polymers can also be used concomitantly to control particular properties, e.g. flow properties. Where ethers are used, care should be taken to ensure that these are free from peroxide so that premature polymerization of the acrylate double bonds does not take place.

For molecular weights as high as about 2,000, the polyurethane acrylate polymers can also be prepared in the absence of a solvent. This may be advantageous, for example, if further processing is not carried out immediately but it is intended to store the product temporarily for a relatively long time or to transport it over a relatively long distance.

In the preferred temperature range, the reaction of the isocyanate groups with the hydroxyl groups can also be carried out in the absence of a catalyst. Since the reaction at high conversions is very slow when one reactant is not used in excess, the use of a catalyst is more advantageous. The catalysts which can be used here are those which are known from polyurethane chemistry, e.g. tertiary amines, metal salts of fatty acids and other organic metal compounds. The catalysts chosen are preferably those which predominantly catalyze urethane formation and which promote reactions such as allophanate formation or isocyanurate formation as little as possible. Compounds of tetravalent tin, e.g. dibutyl-tin dilaurate, are particularly useful. In general, it has proven advantageous to use from 0.005 to 0.3, preferably from 0.01 to 0.15, part by weight per 100 parts by weight of polyurethane acrylate. The catalyst can also be introduced at the beginning of the reaction, can be added to the reaction mixture gradually together with the feed, or can be added in the subsequent stirring phase.

In addition to the polyurethane acrylate polymer, the novel binders generally contain further radiation-curable components in the form of resins and monomers which have a relatively low molecular weight and in general also a relatively narrow molecular weight distribution. Such polymerizable compounds are state of the art in the field of UV-curable or electron beam-curable coating materials. Reference may be made to, inter alia, German Laid-Open Applications DOS 2,049,714, DOS 2,049,715, DOS 2,064,701, DOS 2,232,822, DOS 2,249,446, DOS 2,358,948, DOS 2,441,148, DOS 2,452,322, DOS 2,636,425 and DOS 2,636,426, in which such radiation-curable components are described for other applications.

Among the many substances listed here, products which are particularly suitable for use in magnetic recording media are those whose molecules contain, as double bonds which can undergo free radical polymerization, acrylyl or N-vinyl double bonds.

Instead of acrylyl compounds, it is also possible to use methacrylyl compounds. Because of their substantially lower polymerization rate, however, they should be used in no more than a relatively small amount, in combination with acrylyl compounds. Compounds containing N-vinyl double bonds should be used in an amount such that there is not more than 50, preferably not more than 40, mol %, based on the total concentration of all polymerizable double bonds, of N-vinyl double bonds.

The choice of compounds which can be combined with the polyurethane acrylate polymers principally comprises prepolymers having two or more polymerizable double bonds and molecular weights of less than 1,500, preferably from 500 to 1,100, monofunctional, bifunctional or trifunctional acrylates having molecular weights of >180, preferably from 220 to 400, in the form of derivatives of simple aliphatic, cycloaliphatic or aliphatic-aromatic alcohols and modifications of these, and monofunctional N-vinyl monomers in the form of N-vinyllactams or N-vinylurethanes, prepared from N-vinyl isocyanate and monofunctional alcohols.

Individual examples of these prepolymers are epoxide acrylates as reaction products of epoxy resins with acrylic acid, especially those obtained from bisphenol A epoxy resins; polyester acrylates prepared from hydroxyl-containing polyesters of aliphatic, cycloaliphatic or aromatic diols with saturated dicarboxylic acids and acrylic acid, and urethane acrylates obtained from diisocyanates of polyisocyanates and hydroxyalkyl acrylates, the chains of which may furthermore be extended with diols.

Examples of acrylate monomers are phenoxyethyl acrylate, 4-tert.-butylcyclohexyl acrylate, isobornyl acrylate, dicyclopentadienyl acrylate, dicyclopentadienyloxyethyl acrylate, hexanediol diacrylate, 2-(2',5'-dimethylphenyl)-ethyl acrylate, 2-(o-methylphenyl)-ethyl acrylate, 2-(p-methylphenyl)-ethyl acrylate, neopentylglycol diacrylate, triethyleneglycol diacrylate, tetraethyleneglycol diacrylate, tripropyleneglycol diacrylate and trimethylolpropane triacrylate.

Principal examples of N-vinyl monomers are N-vinylpyrrolidone, N-vinylimidazole, N-vinylcaprolactam, the reaction product of N-vinyl isocyanate with ethyl diglycol or phenylglycol.

Examples of modified monofunctional acrylates are the reaction products of the monohydroxyalkyl acrylates, as also used for the preparation of the polyurethane acrylate polymers, with monofunctional isocyanates, such as methyl, propyl, isopropyl, n-butyl or phenyl isocyanate.

The preparation of the complete binder mixture for the binder matrix of the novel magnetic recording media from the individual components is carried out by a simple mixing operation. Because of the strongly polar nature of these binders and the relatively low mean molecular weights, wetting and flow problems frequently occur on certain substrates. Hence, flow improvers based on organic siloxanes, organic fluorine compounds and other substances are usually added to the conventional radiation-curable coating materials. In this context, particularly preferred compounds are commercial organic fluorine assistants, in amounts of from 0.1 to 0.5% by weight, based on binder mixture.

The novel magnetic recording media are produced in a conventional manner. To do this, the magnetic material, e.g. gamma-iron(III) oxide, finely divided magnetite, undoped or doped ferromagnetic chromium dioxide, cobalt-doped gamma-iron(III) oxide or finely divided ferromagnetic metals or metal alloys, such as alloys of iron and cobalt, in a solution of the electron beam-curable binder in an organic solvent is processed into a dispersion in a dispersing apparatus, using other conventional assistants. The magnetic dispersion is then applied to the non-magnetizable base with the aid of the conventional coating apparatus, e.g. a knife coater. The conventional bases, in particular those of 6-36 μm, can be used as a non-magnetic and non-magnetizable base. Before the still liquid coating mixture is dried on the base, an operation which is advantageously carried out at from 50° to 90° C. for from 2 to 5 minutes, the anisotropic magnetic particles are oriented in the intended recording direction by the action of a magnetic field. This can, if required, be followed by very slight partial polymerization of the coating with electron beams, using a dose of less than 10, preferably less than 3, kgray, or with UV light. The magnetic layers are then calendered on conventional apparatus by passing them between polished rollers optionally heated to a temperature of from 30° to 80° C., preferably from 50° to 70° C. The magnetic layer is in general from 3 to 20, preferably from 6 to 15, μm thick.

Curing of the magnetic recording layer is completed by means of accelerated electrons, the method employed for this being prior art. Suitable electron accelerators are those having an acceleration voltage of from 150 to 300 kV. Both scanner and linear cathode apparatuses having voltages of from 150 to 200 kV and a radiation output of more than 500, preferably more than 1,000, kgray/sec are suitable.

The irradiation time or web speed is controlled so that the magnetic coating is irradiated with an energy dose of from 30 to 150, preferably from 50 to 100, kgray. The dose required for optimum complete polymerization of the double bonds varies somewhat with the composition, and is on average about 60-70 kgray in the case of binders possessing the best mechanical properties. A dose of only 10 kgray always gives dry non-tacky coatings which however still possess unsatisfactory mechanical properties.

The use of a polyurethane acrylate having a broad molecular weight distribution coupled with a relatively low number average molecular weight permits solids contents of about 40–65% by weight at a casting viscosity of from 400 to 600 mPas of the pure binder solution, depending on the molecular weight of the polyurethane acrylate and the type and amount of the radiation-curable prepolymers or monomers added. In the preparation of magnetic dispersions, and where the stated binders are used, we have found, surprisingly, that, even when the polyurethane acrylate has a molecular weight of 6,000 or above, or the number average molecular weight after the addition of prepolymers and monomers is from 2,000 to 3,000, the solvent requirement is no higher than in the case of binders which consist only of such prepolymers or monomers. Consequently, in the case of highly pigmented dispersions, the number average molecular weight of the polymerizable binder mixture can be increased from 400–600 in the case of prepolymer/monomer mixtures employed to date to 2,000–3,000, and the mechanical properties can therefore be improved. The upper limit of the molecular weight of the polyurethane acrylate is given as 10,000.

In comparison with the currently employed binder systems which are not electron beam-curable, there is a saving of solvent of as much as 60% by weight.

The novel magnetic recording media have very uniform magnetic layers with a particularly smooth surface. Moreover, the magnetic, electroacoustic and video properties are further improved. The increase in the orientation ratio (RF), i.e. the ratio of the residual induction in the direction of orientation of the anisotropically shaped particles to that at right angles to this direction, is noteworthy. This results in an increase in the remanence and the hysteretic squareness ratio. Accordingly, the sensitivity and maximum output level are improved. The fact that, in the production of the novel magnetic recording media, dispersing of the finely divided magnetic particles in the organic medium can be carried out more simply and, surprisingly, more rapidly is also worthy of note. The consequently milder method of incorporating the magnetic particles imposes less mechanical stress on the generally acicular particles, which is likewise reflected in an improvement in the quality of the magnetic recording media.

The Examples which follow illustrate the invention; the Comparative Experiments represent the state of the art. In the Examples and Comparative Experiments, parts and percentages are by weight, unless stated otherwise.

EXAMPLES

Preparation and testing of polyurethane acrylate polymers and binders prepared from these The amounts of the starting components stated in the Examples below are reacted by the following general method:

All the hydroxyl-containing compounds are initially charged together with the solvent into a thoroughly dried stirred vessel possessing a feed means and a reflux condenser, and, in order to stabilize the acrylate double bonds against premature polymerization, 2,6-di-tert.-butyl-p-cresol and tris(n-cyclohexyldiazoniumdioxy)aluminum are added, each in an amount of 1,000 ppm, based on the total weight of all hydroxy compounds and isocyanates.

The mixture is heated to 50° C. under an atmosphere of dry nitrogen. Feeding in of the isocyanate is begun, the reaction temperature being brought to about 60° C. by cooling. Feeding in takes from 30 to 60 minutes. To remove the major part of the heat of reaction, stirring is continued for about a further 30 minutes, after which 1,000 ppm, based on the total weight of all components except the solvent, of dibutyl-tin dilaurate are added to the mixture. Stirring is continued for a further 3–5 hours, until the residual isocyanate content is less than 0.1% by weight of NCO.

Finally, 3,000 ppm of a fluoro-organic oligomer are added to the mixture, as a flow improver for further processing, and the resulting polymer solution is filtered through a 5 μm filter.

The calculation of the parameters stated in the Examples and relating to number average molecular weight, concentration of crosslinking and NH concentration are based on the use of analytically obtained parameters for the starting materials, such as number of double bonds, isocyanate content and hydroxyl number. For the conversion to the polyurethane acrylate and for the binder mixtures, however, the calculations have been made assuming ideal conditions which are only approximately achieved in practice. In particular, the degree of crosslinking and the molecular weight can differ from the calculated values by an average of up to 10%.

The magnitude and distribution of the molecular weights were determined in general by a combination of viscometry, high pressure gel permeation chromatography, light scattering and vapor pressure osmometry, using the simplest urethane acrylates as model compounds and calibration standards.

To test the mechanical properties, coatings of the binders were produced on sheets of glass so that the resulting dry film was from 60 to 80 μm thick, the solvent being removed by drying in the air overnight and for one hour under reduced pressure, in each case at room temperature. This was followed by irradiation with electrons under nitrogen having a residual oxygen content of less than 200 ppm, using an acceleration voltage of 175 kV and a dose of 70 kgray, on a CB150/15/10 type linear cathode apparatus from Energy Sciences Inc.

Any post-curing was effected by storing the irradiated films exposed to the air at room temperature for 1 day, and small residual amounts of solvent were removed by heating for one hour at 100° C. under reduced pressure. The films were then carefully removed from the sheets of glass with the aid of a knife. Where a fluoro-organic flow improver was used, the films could in general be detached without problems. In isolated cases, films could be prepared only by applying a coating to aluminum foil and then dissolving the aluminum with dilute sodium hydroxide solution.

The modulus of elasticity was determined according to DIN 53,457, at 23° C., in general as a secant modulus at 0.1% elongation.

The tensile strength and the elongation at break were determined in accordance with DIN 33,504, likewise at 23° C.

EXAMPLE 1

| | |
|---|---|
| Binder composition | 60 of polyurethane acrylate 1 |

-continued

| (Amounts without solvent) [Parts by weight] | 16 of epoxy resin acrylate EPA 1050 14.4 of phenoxyethyl acrylate 9.6 of N—vinylcaprolactam | | |
|---|---|---|---|
| Components in the polyurethane acry- Late 1 (= PUA 1) | | Ratio of the number of equivalents, based on 10 OH | Amount of mixture [g] |
| Isocyanate | MDI | 10.27 | 737.8 |
| Polymeric diol | PCD 415 | 4.09 | 976.4 |
| Monomeric diol | butane-1,4-diol | 3.18 | 82.3 |
| OH—alkyl-acrylate | HPA | 2.73 | 101.8 |
| Solvent Amount of this in the feed | THF | | 1636 451 |

| Properties | PUA 1 | Binder mixture |
|---|---|---|
| NH concentration, calculated [mole/kg] | 2.95 | 1.95 |
| Concentration of cross-linking, calculated [mole/kg] | 0.75 | 0.75 |
| Number average molecular weight, calculated | 2670 | |
| Number average molecular weight, found | 2900 | |
| Weight average molecular weight, found | 8400 | |
| Mw/Mn | 2.9 | |
| Solids content for 100 sec efflux time, Ford beaker 4 [% by weight] | 44.4 (53)* | 49.3 (63)* |
| Modulus of elasticity [N/mm²] | 17 | 168 |
| Tensile strength [N/mm²] | 26.7 | 37.3 |
| Elongation at break [%] | 148 | 104 |

*Solution strongly thixotropic, ( ) = values directly after the preparation of the PUA
Abbreviations:
MDI = 4,4'-diphenylmethane diisocyanate
PCD 415 = polycaprolactonediol, OH equivalent weight 415
HPA = 2-hydroxypropyl acrylate, isomer ratio 64:36
EPA 1050 = epoxy resin acrylate, molecular weight 1050, obtained from 2 moles of bisphenol epoxy resin (epoxide equivalent weight 186), 2 moles of acrylic acid and 1 mole of adipic acid.

EXAMPLE 2

| Binder composition (Amounts without solvent) [Parts by weight] | 60 of polyurethane acrylate 1 16 of urethane acrylate resin UA 1050 14.4 of phenoxyethyl acrylate 9.6 of N—vinylcaprolactam | | |
|---|---|---|---|
| Components in the polyurethane acry- late 1 (= PUA 1) | | Ratio of the number of equivalents, based on 10 OH | Amount of mixture [g] |
| Isocyanate | MDI | 10.27 | 737.8 |
| Polymeric diol | PCD 415 | 4.09 | 976.4 |
| Monomeric diol | butane-1,4-diol | 3.18 | 82.3 |
| OH—alkyl-acrylate | HPA | 2.73 | 101.8 |
| Solvent Amount of this in the feed | THF | | 1636 451 |

| Properties | PUA 1 | Binder mixture |
|---|---|---|
| NH concentration, calculated [mole/kg] | 2.95 | 2.35 |
| Concentration of cross-linking, calculated [mole/kg] | 0.75 | 0.75 |
| Number average molecular weight, calculated | 2670 | |
| Number average molecular weight, found | 2900 | |
| Weight average molecular weight, found | 8400 | |
| Mw/Mn | 2.9 | |
| Solids content for 100 sec efflux time, Ford beaker 4 [% by weight] | 44.4 (53)* | 55.2 (65)* |
| Modulus of elasticity [N/mm²] | 17 | 70 |
| Tensile strength [N/mm²] | 26.7 | 45.2 |
| Elongation at break [%] | 148 | 136 |

*Solution strongly thixotropic, ( ) = values directly after the preparation of the PUA
Abbreviations:
MDI = 4,4'-diphenylmethane diisocyanate
PCD 415 = polycaprolactonediol, OH equivalent weight 415
HPA = 2-hydroxypropyl acrylate, isomer ratio 64:36
UA 1050 = urethane acrylate resin, molecular weight 1050, obtained from hexamethylene diisocyanate, polyneopentylglycol adipate having an OH equivalent weight of 284 and hydroxypropyl acrylate, the ratio of the number of equivalents being 10.5:4.51:5.49.

EXAMPLE 3

| Binder composition (Amounts without solvent) [Parts by weight] | (a) 100 PUA 2 (b) 70 PUA 2 16 of phenoxyethyl acrylate 12 of N—vinylcaprolactam | | |
|---|---|---|---|
| Components in the polyurethane acry- late 2 (= PUA 2) | | Ratio of the number of equivalents, based on 10 OH | Amount of mixture [g] |
| Isocyanate | MDI + TDI 80 | 5.0 + 5.0 | 335 + 233 |
| Polymeric diol | PBA 510 | 2.58 | 706 |
| Monomeric diol | butane-1,4-diol | 6.37 | 153.6 |
| OH—alkyl-acrylate | HPA | 1.04 | 72.7 |
| Solvent Amount of this in the feed | THF | | 1227 100 |

| Properties | (a) | (b) |
|---|---|---|
| NH concentration, calculated [mole/kg] | 3.57 | 2.5 |
| Concentration of cross-linking, calculated [mole/kg] | 0.36 | 0.25 |
| Number average molecular weight, calculated | 5600 | |
| Number average molecular weight, found | 5500 | |
| Weight average molecular weight, found | 15300 | |
| Mw/Mn | 2.78 | |
| Solids content for 100 sec efflux time, Ford beaker 4 [% by weight] | 40.4 | 51.5 |
| Modulus of elasticity [N/mm²] | 27 | 161 |
| Tensile strength [N/mm²] | 37.9 | 51.2 |
| Elongation at break [%] | 260 | 218 |

Abbreviations:
MDI = 4,4'-diphenylmethane diisocyanate
TDI 80 = 80:20 mixture of 2,4- and 2,6- toluylene diisocyanate
PBA 510 = polybutane-1,4-diol adipate, OH equivalent weight 510
HPA = 2-hydroxypropyl acrylate, isomer ratio 64:36

EXAMPLE 4

| Binder composition (Amounts without solvent) [Parts by weight] | 100 100 PUA 3 | | |
|---|---|---|---|
| Components in the polyurethane acry- late 3 (= PUA 3) | | Ratio of the number of equivalents, based on 10 OH | Amount of mixture [g] |
| Isocyanate | TDI 80 | 10.0 | 109 456.8 |
| Polymeric diol | PBA 510 | 2.70 | 722.6 |
| Monomeric diol | hexane-1,4-diol | 4.765 | 147.6 |
| OH—alkyl acrylate | HPA | 2.535 | 173.0 |
| Solvent | THF | | 640 |

-continued

| | |
|---|---|
| Amount of this in the feed | 0 |
| Properties | |
| NH concentration, calculated [mole/kg] | 3.5 |
| Concentration of cross-linking, calculated [mole/kg] | 0.85 |
| Number average molecular weight, calculated | 2350 |
| Number average molecular weight, found | 2100 |
| weight average molecular weight, found | 5700 |
| Mw/Mn | 2.71 |
| Solids content for 100 sec efflux time, Ford beaker 4 [% by weight] | 60.5 |
| Modulus of elasticity [N/mm²] | 12 |
| Tensile strength [N/mm²] | 38.4 |
| Elongation at break [%] | 110 |

Abbreviations:
TDI 80 = 80:20 mixture of 2,4- and 2,6- toluylene diisocyanate
PBA 510 = polybutane-1,4-diol adipate, OH equivalent weight 510
HPA = 2-hydroxypropyl acrylate, isomer ratio 64:36

EXAMPLE 5

| Binder composition (Amounts without solvent) [parts by weight] | 75.3 of polyurethane acrylate 4<br>16.5 of epoxy resin acrylate EPA 520<br>8.2 of N—vinylcaprolactam | | |
|---|---|---|---|
| Components in the polyurethane acrylate 4 (= PUA 4) | | Ratio of the number of equivalents, based on 10 OH | Amount of mixture [g] |
| Isocyanate | MDI | 10.0 | 506.3 |
| Polymeric diol | PCD 415 | 5.12 | 861.9 |
| Monomeric diol | butane-1,4-diol | 3.64 | 66.3 |
| OH—alkyl-acrylate | HPA | 1.24 | 65.4 |
| Solvent | THF | | 1500 |
| Amount of this in the feed | | | 500 |
| Properties | | PUA 4 | Binder mixture |
| NH concentration, calculated [mole/kg] | | 2.70 | 2.03 |
| Concentration of cross-linking, calculated [mole/kg] | | 0.33 | 0.85 |
| Number average molecular weight, calculated | | 6000 | |
| Number average molecular weight, found | | 8300 | |
| Weight average molecular weight, found | | 25600 | |
| Mw/Mn | | 3.08 | |
| Solids content for 100 sec efflux time, Ford beaker 4 [% by weight] | | 35.5 | 38.6 |
| Modulus of elasticity [N/mm²] | | 17 | 285 |
| Tensile strength [N/mm²] | | 35.2 | 56.0 |
| Elongation at break [%] | | 314 | 88 |

Abbreviations:
MDI = 4,4'-diphenylmethane diisocyanate
PCD 415 = polycaprolactonediol, OH equivalent weight 415
HPA = 2-hydroxypropyl acrylate, isomer ratio 64:36
EPA 520 = epoxy resin acrylate, molecular weight about 520, obtained from 2 moles of bisphenol A epoxy resin (epoxide equivalent weight 186) and 2 moles of acrylic acid.

EXAMPLE 6

218.2 parts of a 55% strength polyurethane acrylate solution as described in Example 1, 80 parts of a diluent consisting of a mixture of the prepolymer and monomer in the amounts stated in Example 1, 900 parts of chromium dioxide having a coercive force of 47.5 kA/m, 947 parts of a 1:1 (w/w) solvent mixture of tetrahydrofuran and dioxane, 0.9 part of silicone oil and 22.5 parts of zinc oleate were dispersed for 72 hours in a ball mill which had a capacity of 6,000 parts by volume and was charged with 8,000 parts by weight of steel balls having a diameter of from 4 to 6 mm. The resulting dispersion was passed under pressure through a filter having 5 μm pores, and then applied to a 12 μm thick polyethylene terephthalate film by means of a conventional knife coater.

The coated film was passed through a conventional magnetic field to orient the magnetic particles and was then dried at from 60° to 80° C., after which the magnetic layer was calendered by passing the coated film twice between heated rollers at 60° C. under a nip pressure of 35 kg/cm. The magnetic layer was then 4.8 μm thick. The coating was then cured by means of an electron beam, the dose used being 70 kgray. The coated film was then slit into 3.81 mm wide audio tapes, which were subjected to magnetic, electroacoustic and mechanical tests. The roughness of the surface of the coated film was determined as the average peak-to-valley height $R_z$, in accordance with DIN 4768, sheet 1. The electroacoustic properties of the resulting tapes were determined according to DIN 45,401, 45,403 and 45,512 (sheet 12), in comparison with the reference tape T 308 S.

| Magnetic properties | |
|---|---|
| $H_c$ (kA/m) | 47.5 |
| Mr (mT) | 186 |
| Orientation ratio | 3.6 |
| $R_z$ | 0.184 μm |
| Electroacoustic data | |
| $E_T$ (sensitivity at long wavelengths) ± 0 db | |
| $E_H$ (sensitivity at short wavelengths) + 2.2 db | |
| $A_T$ (maximum output level at long wavelengths) + 0.3 db | |
| $A_H$ (maximum output level at short wavelengths) + 3.6 db | |
| $RG_A$ (reference level-to-noise ratio) + 1.0 db | |
| Ko (signal-to-print-through ratio) − 2.5 db | |

The tapes furthermore possessed good coefficients of friction and electrical resistance.

EXAMPLE 7

Example 6 was repeated, and the coatings were calendered, slit into half-inch wide video tapes and then tested on a commercial VHS video recorder from Victor Company of Japan (JVC).

| Output | | Frequency | | |
|---|---|---|---|---|
| RF 4.5 MHz | chroma | response | Chroma S/N | $R_z$ |
| + 2.5 db | + 4.5 db | − 1.0 db | − 0.6 db | 0.179 μm | in comparison with CrO₂ reference tape.

EXAMPLE 8

439.3 parts of a 60.7% strength binder solution as described in Example 4, 1.2 parts of silicone oil, 30.0 parts of zinc oleate, 1200 parts of chromium dioxide having a coercive force of 40.1 kA/m and 1147.3 parts of tetrahydrofuran were processed in a ball mill as described in Example 6, and the resulting magnetic mix was used to produce audio tapes, the properties of which were then determined.

| Magnetic properties | |
| --- | --- |
| $H_c$ (kA/m) | 40.1 |
| Mr (mT) | 206 |
| Orientation ratio | 4.0 |
| Mr/Mm | 0.90 |
| Electroacoustic data | |
| $E_T$ (db) | +1.7 |
| $E_H$ (db) | +2.7 |
| $A_T$ (db) | +3.8 |
| $A_H$ (db) | +2.5 |
| $RG_A$ (db) | −0.6 |
| Ko (db) | +1.5 |

EXAMPLE 9

434.8 parts of a 46% strength solution of the binder described in Example 5, in tetrahydrofuran, and 22.5 parts of zinc oleate, 0.9 part of silicone oil, 900 parts of $CrO_2$ having a coercive force of 49.5 kA/m, 234.8 parts of dioxane and 430.4 parts of the 1:1 solvent mixture of tetrahydrofuran and dioxane were dispersed in a ball mill, as described in Example 6. The resulting coating mix was used to produce video tapes which possessed good video properties: the chroma output was particularly high at +5.0 db, in comparison with the reference tape, and the still life was well over 60 minutes.

We claim:

1. A magnetic recording medium which comprises a non-magnetic base and one or more magnetic layers consisting of an organic binder matrix containing finely divided magnetic material, the said matrix being obtained by electron beam curing of a mixture of from 50 to 100% by weight of a polyurethane acrylate polymer possessing polymerizable double bonds and from 0 to 50% by weight of an acrylate and/or an acrylate prepolymer and/or an N-vinyl monomer and/or an N-vinyl prepolymer, wherein the polyurethane acrylate polymer is composed of
   (1) one or more diisocyanates,
   (2) one or more oligomeric or polymeric diols,
   (3) one or more low molecular weight diols, and
   (4) one or more monohydroxyalkyl acrylates,
   and the amount of NCO groups of the diisocyanate is from 95 to 105% of the number of equivalents of OH groups of components 2, 3, and 4 and the molar amounts of the OH-containing components are chosen so that the concentration of urethane groups is from 2.7 to 4.2 moles per kg of polyurethane acrylate polymer, with the proviso that the number average molecular weight of the polymer is from 1,000 to 10,000 and the ratio of the weight average to the number average molecular weight is from 2.2 to 3.5.

* * * * *